(12) United States Patent
Sefidvash et al.

(10) Patent No.: US 9,344,372 B2
(45) Date of Patent: May 17, 2016

(54) UP-CONVERTER FOR ETHERNET PHYSICAL LAYER

(71) Applicant: Broadcom Corporation, Irvine, CA (US)

(72) Inventors: Khorvash Sefidvash, San Clemente, CA (US); Hassaan Aslam, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 310 days.

(21) Appl. No.: 13/646,835

(22) Filed: Oct. 8, 2012

(65) Prior Publication Data

US 2014/0098742 A1    Apr. 10, 2014

(51) Int. Cl.
*H04L 12/815* (2013.01)
*H04L 12/813* (2013.01)

(52) U.S. Cl.
CPC ............ *H04L 47/22* (2013.01); *H04L 47/20* (2013.01)

(58) Field of Classification Search
CPC ..... H04W 28/22; H04W 52/26; H04W 28/02; H04W 28/0273; H04L 12/54; H04L 47/22; H04L 47/20
USPC ......... 370/229, 230, 231, 232, 310, 328, 351, 370/389, 419; 455/403, 422.1
See application file for complete search history.

(56) References Cited

U.S. PATENT DOCUMENTS

| | | | |
|---|---|---|---|
| 2004/0203383 A1* | 10/2004 | Kelton et al. ................. | 455/41.2 |
| 2005/0005189 A1* | 1/2005 | Khermosh et al. ................ | 714/4 |
| 2006/0109784 A1* | 5/2006 | Weller et al. .................... | 370/229 |
| 2006/0209886 A1* | 9/2006 | Silberman et al. ............ | 370/466 |
| 2008/0317069 A1* | 12/2008 | Huang et al. ................... | 370/503 |
| 2009/0097481 A1* | 4/2009 | Diab et al. ..................... | 370/389 |
| 2009/0232151 A1* | 9/2009 | Furlong et al. ................ | 370/419 |
| 2010/0322105 A1* | 12/2010 | Diab ............................. | 370/254 |
| 2012/0320772 A1* | 12/2012 | Frederiks et al. ............. | 370/252 |

* cited by examiner

*Primary Examiner* — Obaidul Huq
(74) *Attorney, Agent, or Firm* — Brinks Gilson & Lione

(57) ABSTRACT

An interface device includes a first connector to connect to a port of a switch, where the switch sends data packets at a first rate and a second connector to connect to a port of a device, where the device sends data packets at a second rate slower than the first rate. A physical control layer connects to the first connector and the second connector to control a flow of data packets. The physical control layer throttles down the flow of data packets to the second connector when the data packets are travelling from the first connector to the second connector, and matches a speeds of the flow of data packets to the first connector when the data packets are travelling from the second connector to the first connector.

20 Claims, 3 Drawing Sheets

> US 9,344,372 B2

UP-CONVERTER FOR ETHERNET PHYSICAL LAYER

TECHNICAL FIELD

This disclosure relates to sending data packets in a communication network, and to up-converters and throttle control to control the flow of data packets for the Ethernet physical layer.

BACKGROUND

Advances in electronics and communication technologies can result in communication networks capable of communicating data at different speeds. Consumers may be able to send and receive data across multitudes of sources at higher reliability and communication rates. Technology can continue to advance and communication networks grow in size, frequency of use and capability. Data can be communicated with greater efficiency, reliability and quality.

BRIEF DESCRIPTION OF THE DRAWINGS

The systems and methods may be better understood with reference to the following drawings and description. In the figures, like reference numerals designate corresponding parts throughout the different views.

DETAILED DESCRIPTION

The systems and methods described relate to an up-converter for an Ethernet physical layer device to enable systems to operate a slower line rate with a faster line rate. For purposes of explanation line rates of 2.5 Gbit/s and 10 Gbit/s are used, but the systems and methods can also be used with other differing line rates. The systems and methods can allow the Ethernet physical layer to match speeds between a line and system interface at the physical layer for legacy switch systems without changing legacy switches. The systems and methods can allow new line rates, e.g., 2.5 Gbit/s, to operate with existing switch interfaces having faster speeds, e.g., 10 Gbit/s, while sustaining line throughput.

Figure 1:
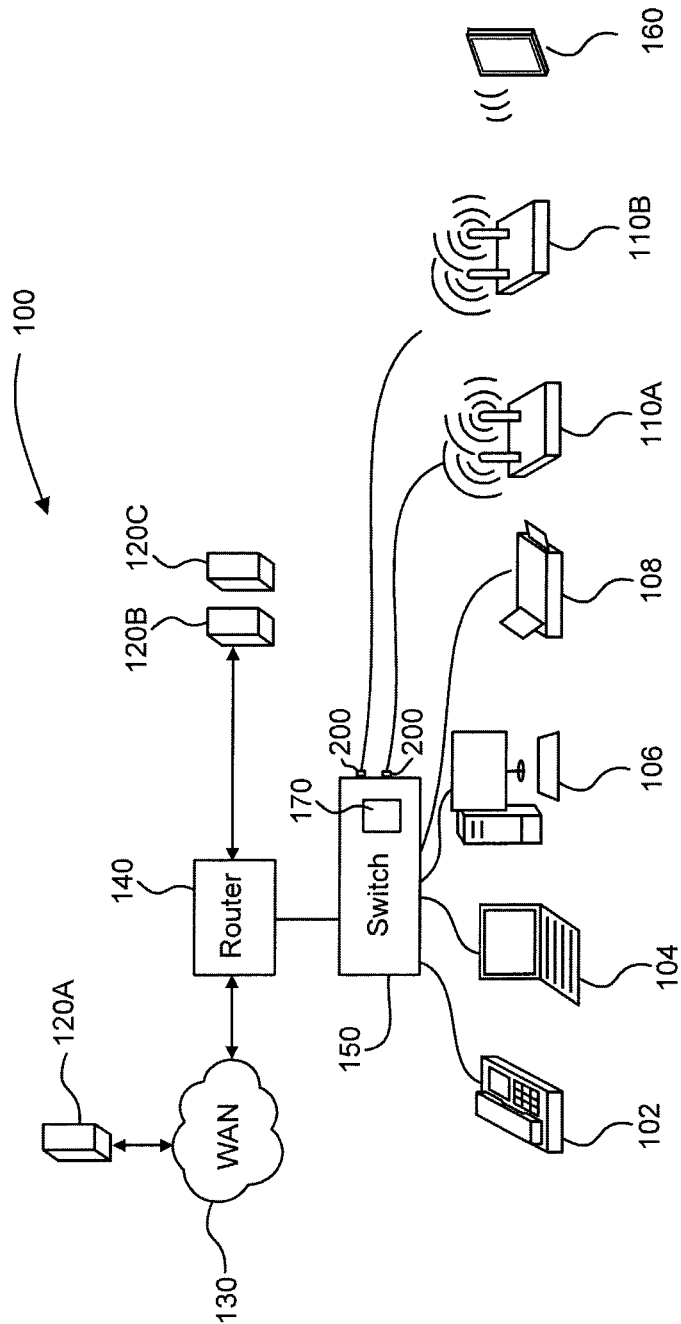
FIG. 1 is a block diagram of an exemplary network.

FIG. 1 is a block diagram of an exemplary network 100. The network 100 can be used for computer data traffic, telecommunication traffic, etc. The system 100 can be used to send information from servers 120A, B, C, etc. to devices, e.g., an Internet protocol (IP) phone 102, a laptop 104, a desktop computer 106, a printer 108 and a wireless access point 110A, B, etc. The information can be sent locally or remotely, e.g., over local area networks (LAN) and over wide area networks (WAN) 130 such as the Internet. The servers 120A, B, C can be connected with the devices through a router 140 and a switch or controller, hereinafter switch 150. Other devices can also connect to the switch 150, e.g., a tablet 160, televisions, phones, personal digital assistants (PDAs), and other devices cable of connecting to a network.

Data packets to and from the servers 120A, B, C can be transmitted to and from the devices, e.g., access points 110A, B, via a router 140 and the switch 150, etc. The router 140 and the switch 150 can be implemented as separate devices or together in a single device. Devices, e.g., access points 110A, B, can also communicate with each other via a local area network, e.g., via the Ethernet. The switch 140 includes a media access control (MAC) 170 to accommodate the Ethernet packet traffic. A small form factor (SFP) module 200 can be connected between the switch 150 and the access points 110A, B, or other devices.

Figure 2:
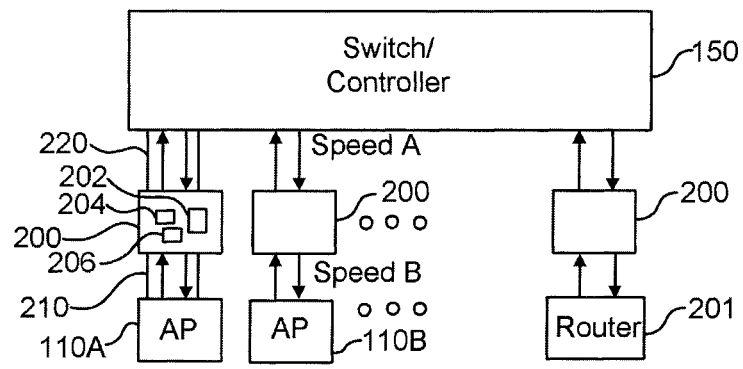
FIG. 2 is a block diagram of the exemplary switch connected with the access points via a small form factor module.

FIG. 2 is a block diagram of the exemplary switch 150 connected with the access points 110A, B or other devices via SFP module 200. The other devices can include a home router 201 and any of the devices of FIG. 1, etc. The SFP module 200 can connect to an uplink port or other port of the switch 150. The switch 150 may transmit data at speed A, e.g., 10 Gbit/s, and the access points 110A, B, or other devices, e.g., IP phone 102, laptop 104, etc., may transmit data at a different speed B, e.g., 2.5 Gbit/s.

The SFP module 200 includes a buffer 202 in memory, a media access control (MAC) layer/up-converter controller 204 and an inserter 206. More or less components can be used depending on an implementation. The SFP module 200 including such components can accommodate up converting the speed of the data transmitted at 2.5 Gbit/s to the 10 Gbit/s data rate of the switch 150. Therefore, instead of redesigning the switch 150 to accommodate 2.5 Gbit/s, the SFP 200 module can plug into a port of the switch 150 or other device to handle up converting.

For purposes of explanation, the buffer 202, MAC layer/up-converter controller 204 and inserter 206 are housed in the SFP module 200, but other housings can be used that connect, either internally or externally, to the switch 150 or other device. A cable 210, e.g., a copper twisted pair Ethernet cable having an RJ45 connector, can be used to connect one end of the SFP module 200 to the access point 110A, B, etc. Connector 220 can be used to connect the SFP module 200 and a port 230 of the switch 150. Ethernet signals can be sent from the access point 110A, B, etc. at speed A, e.g., 2.5 Gbit/s or higher, and the connector 220 can up-convert them to speed B, e.g., 10 Gbit/s. The systems and methods are described for 2.5 Gbit/s and 10 Gbit/s, but other speed conversions can be accommodated such as 4 Gbit/s to 10 Gbit/s or 20 Gbit/s, etc.

Figure 3:
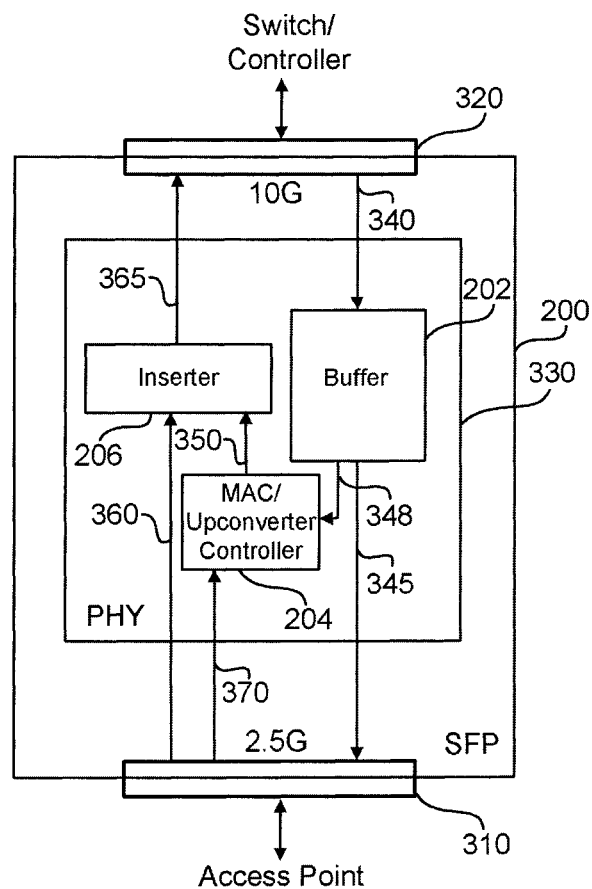
FIG. 3 is a block diagram of the exemplary small form factor interface for performing up-conversion.

FIG. 3 is a block diagram of the exemplary SFP module 200 for performing a physical layer up-conversion and handling of different line rates for devices connected with the SFP module 200. The 2.5 Gbit/s devices such as access points 110A, B, etc. may be used since they can cost less and use less power than the 10 Gbit/s devices. The switch 150 may support a higher line rate than the access points 110A, B, etc., e.g., 10 Gbit/s speed versus 2.5 Gbit/s speed. To accommodate a 2.5 Gbit/s physical layer to work with 10 Gbit/s interface, the SFP 200 provides for up-conversion. The physical layer system can operate at a 2.5 Gbit/s line rate through a 10 Gbit/s interface for legacy units. By up-converting data traffic from 2.5 Gbit/s to 10 Gbit/s and throttling data traffic from 10 G/bit/s to 2.5 Gbit/s, the existing system with 10 Gbit/s interface can accommodate 2.5 Gbit/s without physically changing the switch 150.

To perform up-conversion from the slower to faster devices and to throttle control from the faster to slower devices, the SFP module 150 can include buffer 202, MAC layer/up-converter controller 204 and inserter 206. These components can manage different line rates between the switch 150 and other peripherals such as the access points 110A, B. The inserter 206 can also provide for multiplexing functionality. The buffer 202, MAC layer/up-converter controller 204 and inserter 206 can be incorporated into a physical layer PHY 330 of the SFP module 150. The buffer 202 can include enough memory space to store two or more packets at a time.

If packets are 2 KB in size, a 4 KB buffer can be used, and if packets are 10 KB is size, a 20 KB buffer can be used. Other sized buffers can be used depending upon an implementation.

The buffer 202 received traffic flow from the 10 Gbit/s device at 340. The traffic is sent from the buffer to the 2.5 Gbit/s device at 345. To throttle traffic from faster to slower devices, the MAC layer/up-converter controller 204 can monitor at 348 a status of the buffer 202. As the buffer 202 fills to capacity the MAC layer/up-converter controller 204 can send notifications the switch 150 that the buffer 202 is filling up. For example, the MAC layer/up-converter controller 204 can generate an Ethernet pause command to instruct the switch 150 to temporarily stop sending packets. The MAC layer 170 of the switch 150 can de-packetize the command packet to read the command sent by the MAC layer/up-converter controller 204 to temporarily stop sending packets. The switch 150 can then notify the sources sending the packets in the system 100, e.g., the servers 120A, B, C, to temporarily stop sending data.

To send the pause command to the switch 150, when the MAC layer/up-converter controller 202 detects at 348 that the buffer 202 is full, or has passed a fullness threshold, the MAC layer/up-converter controller 204 can create a pause command packet and at 350 send the pause command packet to the inserter 206. The inserter 206 can insert the pause command packet into the data stream 360 coming from the access point 310A, B, etc and output the updated data stream at 365. The pause command packet can then reach the switch 150 to notify the switch 150 to pause the transmission of data packets.

As the buffer 202 empties and a threshold is passed allowing the buffer 202 to store more data, the MAC layer/up-converter controller 204 can generate and send a command to be interpreted by the MAC 170 of the switch 150 to allow more data to be sent. The source, e.g., server 120A, B, C, etc., receives the command and begins to send more data. Therefore, MAC layer/up-converter controller 204 allows for speed throttling of the flow of data packets from the 10 Gbit/s switch 150 to the 2.5 Gbit/s devices.

Since the switch 150 can handle 10 Gbit/s data flow, the inserter 206 can add the pause commands to the 2.5 Gbit/s data stream 360 without affecting a flow of the data stream 360. The MAC layer/up-converter controller 204 can also up-convert the data flow to match the speed from 2.5 Gbit/s to 10 Gbit/s, e.g., by adding idle codes to the data stream 360. The MAC layer/up-converter controller 204 can send at 350 the idle codes to the inserter 206 to be inserted into the data stream 360. The MAC layer/up-converter controller 204 can determine when to add the idle codes and how many idle codes to add by monitoring at 370 the flow of the data stream 360. For example, the MAC layer/up-converter controller 204 can add 7.5 Gbit/s of data to the 2.5 Gbit/s data stream 360. The data can include the idle codes and pause/resume commands as described above. Therefore, the MAC layer/up-converter controller 204 up-converts the speed of 2.5 Gbit/s to 10 Gbit/s, e.g., to match the 10 Gbit/s speed of switch 150.

Figure 4:
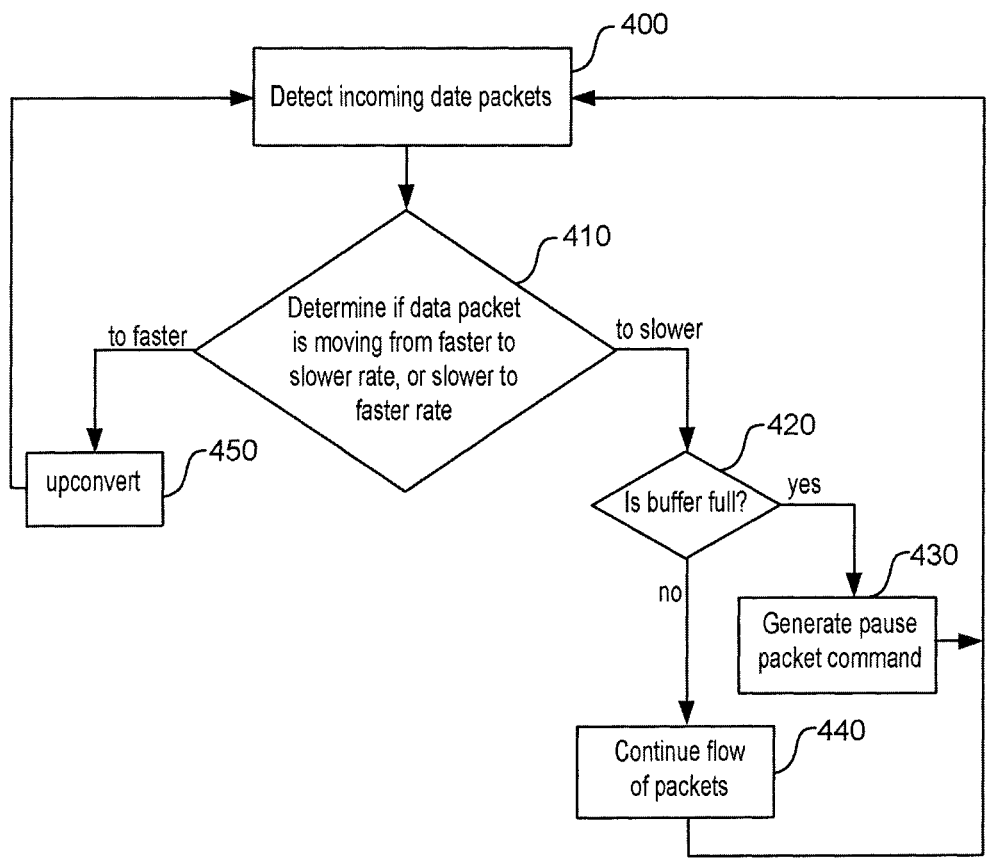
FIG. 4 is a flowchart of an exemplary process for connecting a faster data flow rate with a slower data flow rate.

FIG. 4 is a flowchart of an exemplary process for connecting a faster data flow rate with a slower data flow rate. The PHY 330 can detect incoming data packets (400). The PHY 330 can determine if the data packets are moving from a faster rate device to a slower rate device or from a slower rate device to a faster rate device (410). If the data packets are moving from the faster rate device to the slower rate device, the PHY 330 can determine if the buffer 202 is full (420). If the buffer 202 is full, the PHY 330 can throttle down a flow of the data packets when needed, e.g., by having the MAC layer/up-converter controller 204 send a data packet containing a pause command to the switch 150 (430). If the buffer 202 is not full the flow of data packets can continues to be sent to the slower rate device (440).

When the data packets are moving from the slower rate device to the faster rate device, the MAC layer up-converter controller 204 can up-convert the data packets to the faster rate (450), e.g., by inserting idle codes. For example, the PHY 330 can match the speed of the flow of the data packets to the rate of the faster device. The faster device knows to ignore the idle codes.

While various embodiments have been described, it will be apparent that many more embodiments and implementations are possible. Accordingly, the systems and methods are not to be restricted except in light of the attached claims and their equivalents.

What is claimed is:

1. A method for transferring data packets, comprising:
   detecting data packets being transferred over a network between a faster rate device and a slower rate device relative to the faster rate device;
   determining, at a first layer of a network protocol for the network, if the data packets are moving from the faster rate device to the slower rate device or from the slower rate device to the faster rate device;
   responsive to the determination:
      when the data packets are moving from the faster rate device to the slower rate device at a first rate, throttling to a second rate that is slower than the first rate, via a second layer of the network protocol, a flow of the data packets, the second layer different from the first; and
      when the data packets are moving from the slower rate device to the faster rate device:
      determining, at the second layer, a differential rate corresponding to a difference between the first rate and the second rate;
      monitoring the data packets being transferred to determine a number of pause command packets that correspond to the differential rate; and
      while sustaining a throughput of the slower rate device, up-converting the data packets to the faster rate by adding the number of pause command packets, at the second layer of the network protocol.

2. The method of claim 1 further comprising buffering data packets in a data buffer sent between the faster rate device and the slower rate device.

3. The method of claim 2 further comprising pausing a flow of data packets when the data buffer is full.

4. The method of claim 1 where up converting comprises matching a speed of the flow of the data packets to the faster rate.

5. The method of claim 1 where the faster rate comprises 10 Gbps.

6. The method of claim 1 where the slower rate comprises 2.5 Gbps.

7. A device, comprising:
   first interface circuitry configured to couple to a first node, where the first node is configured to transmit at a first rate;
   second interface circuitry configured to couple to a second node, where the second node is configured to transmit at a second rate slower than the first rate; and
   network circuitry configured to: couple the first interface circuitry and the second interface circuitry via a physical layer to control a flow of data packets, the physical layer configured to:

responsive to a direction of the flow of data packets, determine whether to throttle the data flow or up-convert a speed a of the data flow;

cause a media access control layer to throttle down the flow of data packets to the second interface circuitry when the data packets are travelling from the first interface circuitry to the second interface circuitry; and when the data packets are travelling from the second interface circuitry to the first interface circuitry:
  determine, at the media access control layer, a differential rate corresponding to a difference between the first rate and the second rate;
  determine a number of pause command packets that correspond to the differential rate by monitoring the flow of data packets; and
  while sustaining a throughput of the data flow, cause the media access control layer to insert the number of pause command packets into the flow of data packets to up-convert a speed of the flow of data packets to the first interface circuitry.

8. The device of claim 7 further including a small form factor module, where the network circuitry is housed in the small form factor module.

9. The device of claim 8 where the first interface circuitry comprises a small form factor connection to the first node.

10. The device of claim 9, where the small form factor connection to the first node is configured to couple the first node to a wireless access point.

11. The device of claim 7 where the second interface circuitry comprises an Ethernet interface.

12. The device of claim 7, where the media access control layer is configured to generate a pause command packet to send to the first node to throttle the flow of data packets.

13. The device of claim 12 further comprising a buffer in data communication with the media access control layer, the buffer configured to store received data packets; and
  where the media access control layer is configured to generate the pause command when the buffer is full.

14. The device of claim 7 where the first node comprises a switch.

15. The device of claim 7 where the second node comprises an access point.

16. The device of claim 7, where:
the first rate comprises A Gbps;
the second rate comprises B Gbps; and
when the data packets are travelling from the second interface circuitry to the first interface circuitry, the network circuitry is configured to cause the media access control layer to insert up-conversion data at (A−B) Gbps.

17. A product comprising:
a machine-readable medium other than a transitory signal; and
instructions stored on the machine-readable medium, the instructions configured to when executed by the machine:
  control, via a media access control layer, a data flow between a first node and a second node, the first node configured to transfer data packets at a first rate, the second node configured to transfer data packets at a second rate slower than the first rate;
  determine, via a physical layer, a direction of the data flow;
  when data packets are travelling from the first node to the second node, throttle the data flow; and
  when data packets are travelling from the second node to the first node:
    determine, at the media access control layer, a differential rate corresponding to a difference between the first rate and the second rate;
    determine a number of pause command packets that correspond to the differential rate by monitoring the data flow; and
    while sustaining a throughput of the data flow, up-convert the data flow by inserting the number of pause command packets into the data flow.

18. The product of claim 17, where the instructions are further configured to cause a pause command to be sent to the first node via the media access control layer when a buffer threshold is crossed.

19. The product of claim 18, where the buffer comprises memory storage capacity to hold at least two data packets of the data flow.

20. The product of claim 17, where:
the first node comprises an Ethernet switch; and
the second node comprises a wireless access point.

* * * * *